United States Patent [19]

Yamamoto et al.

[11] Patent Number: 5,793,579
[45] Date of Patent: Aug. 11, 1998

[54] THIN FILM MAGNETIC HEAD AND PROCESS FOR PRODUCING SAME

[75] Inventors: Tomomi Yamamoto, Hirakata; Shinji Kobayashi, Daito; Naoto Matono, Kadoma, all of Japan

[73] Assignee: Sanyo Electric Co., Ltd., Osaka, Japan

[21] Appl. No.: 756,520

[22] Filed: Nov. 26, 1996

[30] Foreign Application Priority Data

Nov. 30, 1995 [JP] Japan .................................. 7-337894
Nov. 30, 1995 [JP] Japan .................................. 7-337895

[51] Int. Cl.$^6$ .................................................. G11B 5/147
[52] U.S. Cl. ..................................... 360/126; 360/113
[58] Field of Search ................................. 360/113, 122, 360/126

[56] References Cited

U.S. PATENT DOCUMENTS

| | | | |
|---|---|---|---|
| 4,219,853 | 8/1980 | Albert et al. | 360/122 X |
| 4,943,882 | 7/1990 | Wada et al. | 360/126 |
| 5,018,037 | 5/1991 | Krounbi et al. | 360/113 |
| 5,218,497 | 6/1993 | Tanabe et al. | 360/113 |
| 5,535,079 | 7/1996 | Fukazawa et al. | 360/126 |
| 5,609,971 | 3/1997 | Matono et al. | 360/126 X |

Primary Examiner—John H. Wolff
Attorney, Agent, or Firm—Nikaido, Marmelstein, Murray & Oram LLP

[57] ABSTRACT

A process for producing a thin film magnetic head comprises a first step of forming a magnetic layer 20 on the surface of a gap spacer layer 9, a second step of forming on the surface of the magnetic layer 20 a lower resist layer 21 shaped to have a smaller width than an upper core layer 11 when seen from above and forming on the resist layer 21 an upper resist layer 22 projecting outward beyond opposite side faces of the resist layer 21 and shaped in conformity with the shape of the upper core layer 11 when seen from above, a third step of shaping the magnetic layer 20 into the upper core layer 11 by ion beam-etching the magnetic layer 20, and a fourth step of removing the lower resist layer 21 and the upper resist layer 22. The core layer 11 consequently formed has a surface including a pair of curved faces R, R smoothly connecting opposite side faces of the layer 11 with respect to the direction of width of a track to the top face of the layer 11, enabling a protective layer forming step to provide a flawless protective layer 14.

4 Claims, 12 Drawing Sheets

THIN FILM MAGNETIC HEAD AND PROCESS FOR PRODUCING SAME

FIELD OF THE INVENTION

The present invention relates to thin film magnetic heads comprising an inductive head element, or composite thin film magnetic heads comprising an inductive head element and magnetoresistive (MR) head element integral therewith, and a process for producing such heads.

BACKGROUND OF THE INVENTION

With reference to FIG. 8, composite thin film magnetic heads of the floating type installed in hard disk drive devices or the like generally comprise a substrate 1 which serves as a head slider and which has a surface providing air bearing faces S and a side face providing an inductive head element H1 for signal recording and a magnetoresistive head element H2 for signal reproduction.

FIG. 9 shows the two head elements H1 and H2 as they are seen from one side thereof to be opposed to magnetic recording media.

The substrate 1 is formed thereon with an insulating layer (not shown) when so required, and further has formed on the layer superposed layers, i.e., a lower shield layer 3, lower insulating layer 4, MR element layer 5, electrode layers 6, 6 and upper insulating layer 7 to constitute the magnetoresistive head element H2. Superposed on the head element are a lower core layer 8, lower insulating layer (not shown), coil layer (not shown), upper insulating layer (not shown), gap spacer layer 9 and upper core layer 16 which provide the inductive head element H1.

As shown in FIG. 8, the inductive head element H1 has a coil layer 50 extending while surrounding the upper core layer 16. The coil layer 50 has opposite ends which are connected to a pair of bump layers 13, 13 by a pair of terminal layers 12, 12, respectively. The pair of electrode layers 6,6 extending from the MR element layer 5 of the magnetoresistive head element H2 are connected to a pair of bump layers 13, 13 by a pair of terminal layers 12, 12, respectively.

A protective layer 17 covers the electrode layers 6 and the terminal layers 12 along with the two head elements. The bump layers 13 vertically extend through the protective layer 17 and have their surfaces exposed from the protective layer 17.

It is generally known to prepare the upper core layer of the inductive head element H1 by electric field plating or by ion beam etching. In FIGS. 8 and 9, the upper core layer as formed by electric field plating is indicated at 16, and the upper core layer as formed by ion beam etching at 18.

FIGS. 10(a) to 10(d) and FIGS. 11(a) to 11(c) show a process for forming the upper core layer 16 by electric field plating. These drawings are views in section taken along the line A—A in FIG. 9.

As shown in FIG. 10(a), a lower shield layer 3, lower insulating layer 4, MR element layer 5, electrode layer 6, upper insulating layer 7, lower core layer 8 and gap spacer layer 9 are successively formed on a substrate (not shown). A seed layer 15 serving as a ground layer for plating is thereafter formed on the gap spacer layer 9 by sputtering.

A resist is then applied to the entire surface of the seed layer 15, exposed to light and developed, whereby a resist frame 23 is formed in a pattern in conformity with an upper core layer 16 as shown in FIG. 10(b). An Ni-Fe layer 26 providing the upper core layer 16 is then formed on the seed layer 15 by electric field plating as shown in FIG. 10(c). Since electric field plating is resorted to, the Ni-Fe layer 26 is not formed on the surface of the resist frame 23, permitting upper end portions of the resist frame 23 to project from the surface of the Ni-Fe layer 26 as illustrated. The resist frame 23 and the Ni-Fe layer 26 are thereafter entirely coated with a resist to form a resist layer 24 as seen in FIG. 10(d).

Subsequently, the surface of the resist layer 24 is exposed to light and developed, whereby the layer 24 is made to have the same width as the resist frame 23 as shown in FIG. 11(a). The portions of the Ni-Fe layer 26 and the seed layer 15 extending outwardly of the outer periphery of the resist frame 23 are then removed by wet-etching the surface of the layer 26 as shown in FIG. 11(b), whereby the upper core layer 16 is formed. The resist frame 23 and the resist layer 24 are thereafter removed with an organic solvent or releasing agent, followed by the formation of a protective layer 17 by sputtering as seen in FIG. 11(c).

On the other hand, FIGS. 12(a) to 12(e) and FIG. 13 show a process for forming the upper core layer 18 by ion beam etching. These drawings are views in section taken along the line A—A in FIG. 9.

As shown in FIG. 12(a), a lower shield layer 3, lower insulating layer 4, MR element layer 5, electrode layer 6, upper insulating layer 7, lower core layer 8 and gap spacer layer 9 are successively formed on a substrate (not shown). A magnetic layer 27 for providing an upper core layer 18 is then formed by sputtering on the gap spacer layer 9, followed by the formation of a resist layer 25 over the entire surface of the magnetic layer 27 as shown in FIG. 12(b). The surface of the resist layer 25 is thereafter exposed to light with use of a mask and developed to shape the resist layer 25 in conformity with the shape of the upper core layer 18 when seen from above as seen in FIG. 12(c).

Subsequently, the magnetic layer 27 is shaped into the upper core layer 18 by etching the surfaces of the resist layer 25 and the layer 27 with an ion beam as shown in FIG. 12(d). To form the opposite sides, with respect to the direction of width of the track, of the core layer 18 perpendicular to this direction at this time, the ion beam is projected onto the resist layer 25 and the magnetic layer 27 approximately vertically. As shown in FIG. 12(e), the resist layer 25 is thereafter removed with an organic solvent or releasing agent.

A protective layer 17 is then formed by sputtering as seen in FIG. 13.

With the production process of FIGS. 10(a) to 10(d) and FIGS. 11(a) to 11(c) wherein the electric field plating method is used, the upper core layer 16 has downwardly tapered side faces Q as seen in FIG. 11(c), so that the protective layer forming step of FIG. 11(c) fails to form the protective layer 17 with good stability since the direction of growth of the layer 17 becomes indefinite or random owing to the influence of the tapered faces Q. Consequently, defects 41 such as cracks or voids are likely to occur in the protective layer 17 as illustrated. Such defects 41, if occurring, will become more pronounced in the subsequent step of polishing the protective layer, giving rise of the problem of impairing the function of the protective layer 17.

It is effective to use a material of high saturation magnetic flux density, e.g., amorphous material, for forming the upper core layer 16 to achieve higher recording densities, whereas such a material can not be used for the core layer 16 when the electric field plating method is adopted for forming the core layer 16 since the electric field plating method requires use of selected materials.

In the production process of FIGS. 12(a) to 12(e) and FIG. 13 wherein ion beam etching is resorted to, atoms or molecules forced out from the magnetic layer 27 upon irradiation with an ion beam in the step (FIG. 12(d)) of forming the upper core layer 18 by ion beam etching deposit on opposite side faces, with respect to the track width direction, of the resist layer 25 as illustrated. The resulting deposit 32 forms projections (rabbit ears) at opposite ends of the upper core layer 18 as seen in section in FIG. 12(e). Consequently, the protective layer forming step of FIG. 13 fails to form the protective layer 17 with stability since the direction of growth of the layer 17 become random by being influenced by the deposit 32. This entails the likelihood of the layer 17 developing detects 42 such as cracks or voids as illustrated. As a result, the defect 42 becomes more pronounced in the subsequent step of polishing the protective layer, leading to the problem of impairing the function of the protective layer 17 as is the case with the process using the electric field plating method.

The deposit 32 formed further produces an error in the width of the upper core layer 18 to result in the problem of failing to give the specified track width.

With reference to FIG. 14, the composite thin film magnetic head is formed in section taken along the line B—B in FIG. 9 with a stepped portion C1 extending from the surface of the lower core layer 8 to the surface of a lower insulating layer 40, a stepped portion C2 extending from the surface of the layer 40 to the surface of an upper insulating layer 70, and a stepped portion C3 extending from the surface of the layer 70 to the surface of the upper core layer 18.

Accordingly, similar-stepped portions corresponding to the stepped portions C1 and C2 are produced in the magnetic layer 27 to be shaped into the upper core layer 18 by ion beam etching, and a stepped portion positioned in corresponding relation with the stepped portion C3 is produced between the magnetic layer 27 to be shaped into the core layer 18 and the surface of the resist layer 25.

Consequently, in the step of ion-beam etching the magnetic layer 27 thus stepped, etching proceeds more rapidly at the stepped portions than at the other flat portions. When the upper core layer 18 has been completely shaped, even the gap spacer layer 9 is etched. As shown in FIG. 14, the gap spacer layer 9 is etched deep at the stepped portions C1, C2 and C3 to entail the likelihood that the underlying lower core layer 8, lower insulating layer 40 and upper insulating layer 70 will be exposed partially.

Especially with respect to the stepped portions C1,C2, it is noted that the material to be made into a film providing the gap spacer layer 9 over the surfaces of the lower core layer 8, lower insulating layer 40 and upper insulating layer 70 is not fully deposited on the slopes of the stepped portions C1, C2, with the result that the film over the stepped portions C1, C2 is thinner than the film over the other flat portions. Accordingly, the thin film portions are completely removed by ion beam etching to expose the lower core layer 8 and the lower insulating layer 40.

If the core layer 8, insulating layer 40 and the upper insulating layer 70 are thus exposed locally, there arises the problem that these exposed portions are exposed to the organic solvent or releasing agent and become swollen in the subsequent resist layer removing step. Furthermore, the gap spacer layer 9, if separated at the stepped portions, lowers in the strength of its bond to the core layer 8 and the insulating layers 40, 70. It is then likely that the gap spacer layer 9 and upper core layer 18 formed thereon will separate when cleaned with the organic solvent or releasing agent. This results in the problem of reducing the yield of the process for producing composite thin film magnetic heads.

SUMMARY OF THE INVENTION

An object of the present invention is to provide a thin film magnetic head having a protective layer free from the defects which would otherwise be produced by the step of forming the protective layer, an upper core layer which can be formed by a material of high saturation magnetic flux density, and an accurate track width, and to provide a process for producing the head.

Another object of the invention is to provide a thin film magnetic head having a lower core layer, lower insulating layer and upper insulating layer which can be produced free of the foregoing problem of swelling, and a gap spacer layer and the upper core layer which can be prevented from separating, and to provide a process for producing the head.

A thin film magnetic head embodying the invention comprises at least one inductive head element provided on a substrate, the head element comprising a lower core layer, an upper core layer and a gap spacer interposed between the core layers, the head element being covered in its entirely with a protective layer. The upper core layer has a surface in contact with the protective layer and including opposite side faces with respect to the direction of width of a track, a top face and a pair of curved faces smoothly connecting the respective side faces to the top face.

With the thin film magnetic head described, the surface of the upper core layer includes a pair of curved faces smoothly connecting the top face of the upper core layer to the respective side faces thereof opposite to each other in the direction of width of the track, so that the protective layer is not grown in random directions in the step of forming the protective layer over the gap spacer layer and the upper core layer. Consequently, the protective layer formed has no defects.

The thin film magnetic head embodying the invention is produced by a process comprising a step of forming a lower core layer on a substrate, a step of forming an upper core layer on the lower core layer with a gap spacer layer interposed therebetween, and a step of forming a protective layer over the gap spacer layer and the upper core layer. The upper core layer forming step has a first step of forming on a surface of the gap spacer layer a magnetic layer for providing the upper core layer, a second step of forming on a surface of the magnetic layer a resist layer including an upper layer portion shaped in conformity with the shape of the upper core layer when seen from above and a lower layer portion constricted relative to the upper layer portion in the direction of width of a track, a third step of shaping the magnetic layer into the upper core layer by ion beam-etching the magnetic layer from above the resist layer, and a fourth step of removing the resist layer.

In the head production process described, the resist layer formed by the second step is so shaped that the lower layer portion is constricted relative to the upper layer portion in the track width direction, so that the deposit to be formed in the next third step of ion beam-etching the surface of the magnetic layer is formed on the upper layer portion of the resist layer without adhering to the lower layer portion. Accordingly, the deposit, which is not formed on the upper core layer, is to be removed along with the resist layer when this layer is removed by the fourth step. As a result, the upper core layer formed has no deposit.

The ion beam use for etching in the third step has a component in parallel to the direction of irradiation and a divergent component. The divergent component is projected obliquely toward a space formed below the upper layer portion of the resist layer to etch the magnetic layer. The portion of the magnetic layer positioned below the upper resist layer portion is therefore also etched, with the result that the upper core layer is formed on its surface with a pair of curved faces smoothly connecting its top face to the respective side faces thereof which are opposed to each other in the track width direction.

In the step of forming the protective layer over the gap spacer layer and the upper core layer, therefore, a flawless protective layer is obtained without the likelihood of the layer growing in random directions. With no deposit formed on the upper core layer, an accurate track width is available.

Stated more specifically, the resist layer comprises a lower resist layer shaped to have a smaller width than the upper core layer in the track width direction when seen from above, and an upper resist layer projecting outward of opposite side faces of the lower resist layer with respect to the track width direction and shaped in conformity with the shape of the upper core layer when seen from above.

Alternatively, the resist layer has an upper face shaped in conformity with the shape of the upper core layer when seen from above and side faces opposed to each other in the track width direction and tapered toward the substrate.

The resist layer thus specifically shaped reliably prevents the deposit from being formed on the upper core layer in the third step.

Another thin film magnetic head embodying the present invention comprises at least one inductive head element provided on a substrate, the head element comprising a coil layer formed above a lower core layer and held between a lower insulating layer and an upper insulating layer, and an upper core layer formed on the upper insulating layer with a gap spacer interposed therebetween, the head element being covered in its entirety with a protective layer. The upper core layer is provided, at opposite sides thereof with respect to the direction of width of a track, with a nonmagnetic reinforcing layer over the gap spacer layer, the protective layer being formed over the reinforcing layer and the upper core layer.

With the magnetic head described, the nonmagnetic reinforcing layer connects each side face of the upper core layer and the surface of the gap spacer to each other, bonding the upper core layer to the gap spacer layer with increased strength. The reinforcing layer is formed by a nonmagnetic material and therefore will not provide a magnetic short circuit between the lower core layer and the upper core layer.

The thin film magnetic head described and embodying the invention is produced by a process comprising a first thin film forming step of successively formed on a substrate a lower core layer, a lower insulating layer, a coil layer, an upper insulating layer and a gap spacer layer, a second thin film forming step of forming an upper core layer on the gap spacer layer, a third thin film forming step of forming a nonmagnetic reinforcing layer over the gap spacer layer at opposite sides of the upper core layer with respect to the direction of width of a track, and a fourth thin film forming step of forming a protective layer over the upper core layer and the nonmagnetic reinforcing layer.

Even if the lower core layer, lower insulating layer and upper insulating layer are partly exposed by ion beam etching in the second thin film forming step of the head production process described, the exposed portions are covered with the nonmagnetic reinforcing layer in the third thin film forming step prior to the removal of a resist layer. The reinforcing layer therefore eliminates the likelihood that the exposed portions of the layers will be exposed to an organic solvent or releasing agent during the removal of the resist layer, consequently obviating the likelihood that the lower core layer, the lower insulating layer and the upper insulating layer will become swollen.

Further even if the gap spacer layer is separated by ion beam etching, the nonmagnetic reinforcing layer is present at the broken portion, bonding the gap spacer to the lower core layer and the lower and upper insulating layers with increased strength. This precludes the gap spacer layer and the upper core layer formed thereon from separating off.

More specifically stated, the second thin film forming step has a step of forming on a surface of the gap spacer layer a magnetic layer for providing the upper core layer, a step of forming on a surface of the magnetic layer a resist layer including an upper layer portion shaped in conformity with the shape of the upper core layer when seen from above and a lower layer portion constricted relative to the upper layer portion in the direction of width of a track, and a step of shaping the magnetic layer into the upper core layer by ion beam-etching the magnetic layer from above the resist layer. The third thin film forming step has a step of forming the nonmagnetic reinforcing layer on the surface of the gap spacer layer, and a step of removing the resist layer.

With the production process comprising the specific steps described, the lower resist layer portion is constricted in the track width direction as compared with the upper layer portion, so that the nonmagnetic reinforcing layer formed by the third thin film forming step does not deposit on the opposite side faces, with respect to the track width direction, of the resist layer. The portion of the reinforcing layer deposited on the upper surface of the resist layer is separate from the portions of the reinforcing layer deposited over the gap spacer layer at the opposite sides, with respect to the track width direction, of the upper core layer. Accordingly, only the reinforcing layer portion deposited on the resist layer upper surface is removed along with the resist layer in the following resist layer removing step.

It is not likely that any deposit will be formed on the upper core layer by the upper core shaping step but the deposit formed is removed together with the resist layer in the resist layer removing step. Consequently, the upper core layer 11 obtained is free from any deposit.

Further when ion beam etching is effected in the upper core shaping step, the magnetic layer positioned below the upper layer portion of the resist layer is also etched, with the result that the upper core layer is formed on its surface with a pair of curved faces smoothly connecting its top face to the respective side faces thereof which are opposed to each other in the track width direction.

In the step of forming the protective layer over the gap spacer layer and the upper core layer, therefore, a flawless protective layer is obtained without the likelihood of the layer growing in random directions. With no deposit formed on the upper core layer, an accurate track width is available.

Stated more specifically, the resist layer comprises a lower resist layer shaped to have a smaller width than the upper core layer in the track width direction when seen from above, and an upper resist layer projecting outward of opposite side faces of the lower resist layer with respect to the track width direction and shaped in conformity with the shape of the upper core layer when seen from above.

Alternatively, the resist layer has an upper face shaped in conformity with the shape of the upper core layer when seen from above and side faces opposed to each other in the track width direction and tapered toward the substrate.

The resist layer having the specific shape described permits the nonmagnetic reinforcing layer forming step to reliably form the reinforcing layer as separated into portions, i.e., a portion formed on the upper surface of the resist layer and portions formed over the gap spacer layer at the opposite sides, with respect to the track width direction, of the upper core layer.

Another thin film magnetic head embodying the invention comprises at least one inductive head element provided on a substrate, the head element comprising a coil layer formed above a lower core layer and held between a lower insulating layer and an upper insulating layer, and an upper core layer formed on the upper insulating layer with a gap spacer interposed therebetween, the head element being covered in its entirety with a protective layer. The upper core layer has a surface in contact with the protective layer and including opposite side faces with respect to the direction of width of a track, a top face and a pair of curved faces smoothly connecting the respective side faces to the top face. The upper core layer is provided, at opposite sides thereof with respect to the track width direction, with a nonmagnetic reinforcing layer over the gap spacer layer, the protective layer being formed over the reinforcing layer and the upper core layer.

With the thin film magnetic head described, the surface of the upper core layer includes a pair of curved faces smoothly connecting the top face of the upper core layer to the respective side faces thereof opposite to each other in the direction of width of the track, so that the protective layer is not grown in random directions in the step of forming the protective layer over the gap spacer layer and the upper core layer. Consequently, the protective layer formed has no defects.

Furthermore, the nonmagnetic reinforcing layer connects each side face of the upper core layer and the surface of the gap spacer to each other, bonding the upper core layer to the gap spacer layer with increased strength. The reinforcing layer is formed by a nonmagnetic material and therefore will not provide a magnetic short circuit between the lower core layer and the upper core layer.

With the thin film magnetic head and the process for producing the head according to the invention, the upper core layer has a surface including opposite side faces, a top face and a pair of curved faces smoothly connecting the respective side faces to the top face. This makes it possible for the protective layer forming step to grow a film with good stability, thereby eliminating the likelihood of defects occurring in the resulting protective layer to afford a thin film magnetic head of high quality. Further because the curved faces of the upper core layer are not parallel to the track width direction, no quasi-gap is likely to occur to ensure an inhibited contour effect.

Since the upper core layer is formed by ion beam etching, a material of high saturation magnetic flux density is usable for forming this layer.

Since no deposit is formed on the upper core layer, an accurate track width can be obtained.

Further with the thin film magnetic head and the process for producing the head according to the invention, the lower core layer, lower insulating layer and upper insulating layer are covered with a nonmagnetic reinforcing layer, which therefore prevents the lower core layer and the lower and upper insulating layers from swelling, also precluding the gap spacer layer and upper core layer from separating off. This enables the production process to achieve an improved yield.

The nonmagnetic reinforcing layer connects the side face of the upper core layer and the gap spacer layer to each other, holding the upper core layer bonded to the gap spacer layer with enhanced strength and thereby reliably preventing the upper core layer from separating off.

DETAILED DESCRIPTION OF EMBODIMENTS

With reference to the drawings concerned, a detailed description will be given of two embodiments of the present invention as practiced for composite thin film magnetic heads of the floating type for use in hard disk drive devices or the like.

First Embodiment

Figure 1:
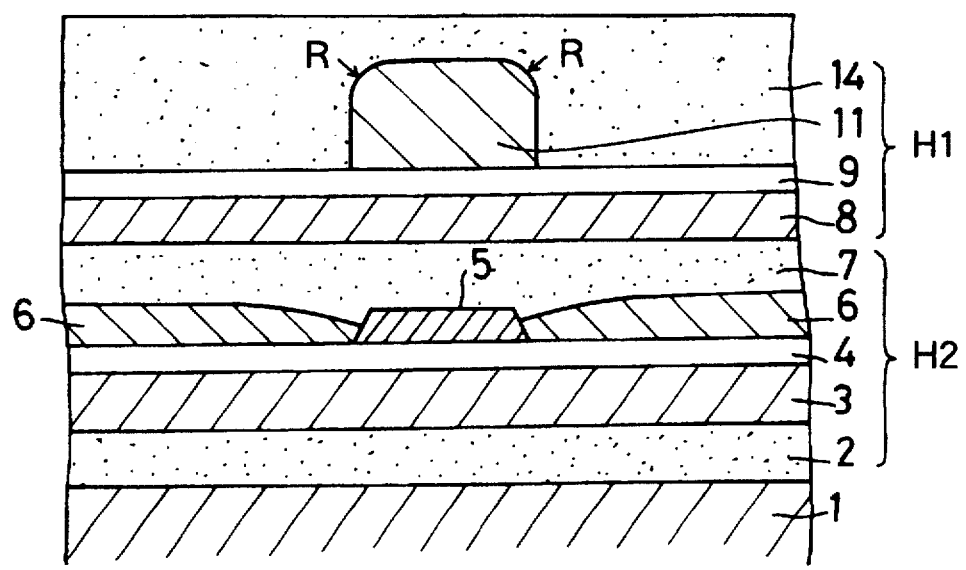
FIG. 1 is a view in section showing a composite thin film magnetic head as a first embodiment.

With reference to FIG. 1, a lower shield layer 3 is formed on a substrate 1 with an insulating layer 2 provided therebetween. Formed successively on the lower shield layer 3 are a lower insulating layer 4, MR element layer 5 and electrode layers 6, 6. An upper insulating layer 7 is further formed over the MR element layer 5 and the electrode layers 6, 6. These layers provide a magnetoresistive head element H2.

Formed over the upper insulating layer 7 is a lower core layer 8, on which an upper core layer 11 is formed with a gap spacer layer 9 interposed therebetween. The upper core layer 11 has a surface which includes opposite side faces with respect to the direction of width of the track, a top face and a pair of curved faces R, R smoothly connecting the respective side faces to the top face. A protective layer 14 is formed over the gap spacer layer 9 and the upper core layer 11 to constitute an inductive head element H1.

In producing the composite thin film magnetic head described, the magnetoresistive head element H2 is first fabricated by successively forming on a substrate 1 of $Al_2O_3$—TiC superposed layers, i.e., an insulating layer 2 of $Al_2O_3$, lower shield layer 3 of Ni-Fe alloy Fe-Al-Si alloy or the like, lower insulating layer 4 of $Al_2O_3$ or the like, MR element layer 5 made of Ni-Fe alloy, soft film or the like, electrode layers 6, 6 of Cu, W, Co-Pt alloy, Co-Pt-Cr alloy or the like and upper insulating layer 7 of $Al_2O_3$ or the like. The inductive head element H1 is then fabricated by successively forming superposed layers, i.e., a lower core layer 8 of Ni-Fe alloy, Co-type amorphous material or the like, lower insulating layer (not shown) of photoresist such as OFPR-800, AZ1350 or AZ4330, coil layer (not shown) of Cu, upper insulating layer (not shown) of photoresist and gap spacer layer 9. These steps are the same as in the prior art.

FIGS. 2(a) to 2(d) and FIGS. 3(a) to 3(d) show in detail the steps following the formation of the gap spacer layer 9 to form the upper core layer 11.

Figure 2A:
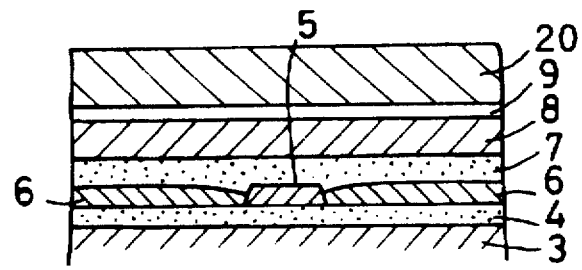
FIGS. 2(a) to 2(d) are process diagrams showing the first half of the step of forming an upper core layer of the first embodiment.

With reference to FIG. 2(a), a substrate (not shown) is successively formed with a lower shield layer 3, lower insulating layer 4, MR element layer 5, electrode layer 6, upper insulating layer 7, lower core layer 8 and gap spacer layer 9. First, a magnetic layer 20 of Ni-Fe alloy, Co-type amorphous material or the like is formed over the entire surface of the gap spacer layer 9 by sputtering.

Figure 2B:
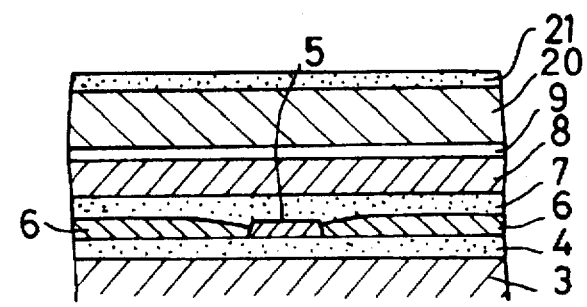
Figure 2C:
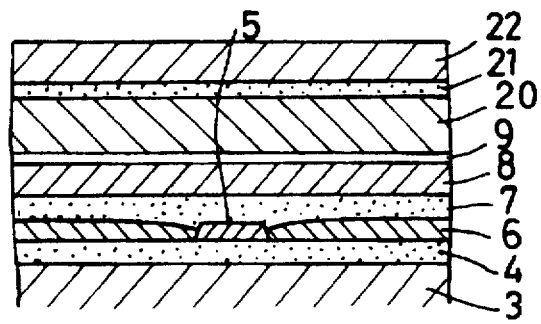
Figure 2D:
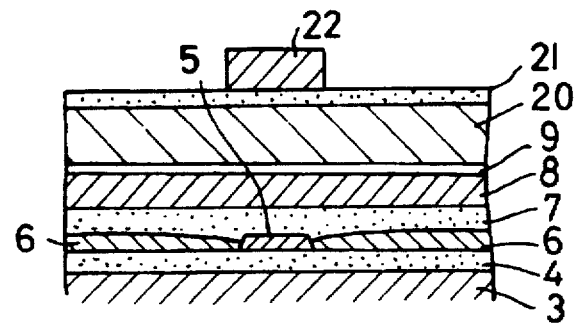

Next, the entire surface of the magnetic layer 20 is coated with a PMMA resist for use with far ultraviolet rays to form a lower resist layer 21 having a thickness of 0.1 to 2.0 μm as shown in FIG. 2(b). The entire surface of the layer 21 is then coated with a resist for g rays or i rays to form an upper resist layer 22, 0.5 to 15.0 μm in thickness, as shown in FIG. 2(c). The surface of the layer 22 is thereafter exposed to g rays or i rays through a mask having an aperture shaped in conformity with the shape of the upper core layer 11, followed by development to shape the upper resist layer 22 in conformity with the shape of the upper core layer when seen from above, as shown in FIG. 2(d).

Figure 3A:
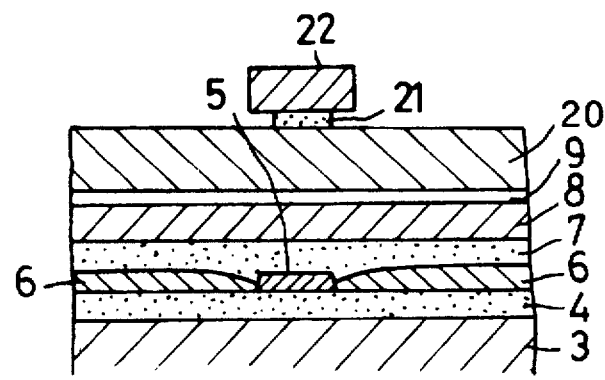
FIGS. 3(a) to 3(d) are process diagrams showing the second half of the step.

Subsequently, the surfaces of the lower resist layer 21 and the upper resist layer 22 are exposed to far ultraviolet rays, followed by development with a developer for removing the PMMA resist for far ultraviolet rays, whereby the two resist layers 21, 22 are shaped into a double resist layer as seen in FIG. 3(a). Consequently, an undercut extending inward of the side face of the upper resist layer 22 by at least 0.1 μm is produced in each side face of the lower resist layer 21. The double resist layer is so shaped that the lower resist layer 21 is given a smaller width than the upper resist layer 22 with respect to the direction of width of the track.

The materials for forming the lower and upper resist layers 21, 22 are not limited to those mentioned above; other materials are also usable insofar as they are different in sensitivity to the light sources to be used later for exposure.

Alternatively, the lower and upper resist layers 21, 22 can be formed by other known method.

For example, a lower resist layer 21 is formed over the entire surface of the magnetic layer 20 and exposed to light through a mask formed with an aperture smaller than the upper core layer as seen from above, using a light source with which the layer 21 is reactive. Subsequently, an upper resist layer 22 is formed over the entire surface of the lower resist layer 21 and exposed to light through a mask having an aperture in conformity with the shape of the upper core layer, using a light source with which the upper resist layer 22 is reactive. The lower and upper resist layers 21 and 22 are thereafter developed with the same developer to shape these layers 21, 22 to a final form. This method is effective for controlling the depth of the undercuts.

Figure 3B:
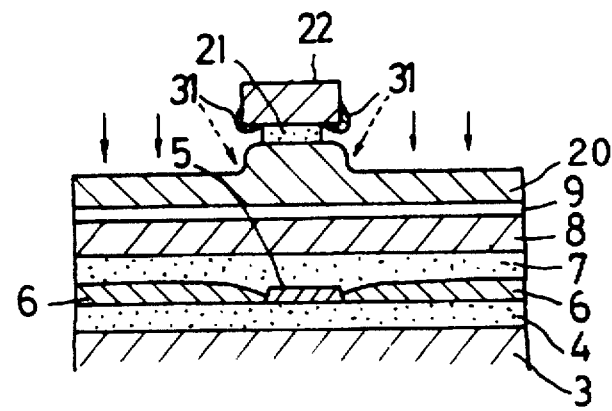

With reference to FIG. 3(b), the surfaces of the magnetic layer 20 and the upper resist layer 22 are irradiated with an ion beam projected substantially perpendicular thereto. With the upper resist layer 22 projecting outward beyond opposite side faces, with respect to the direction of track width, of the lower resist layer 21, the beam produces a deposit 31 on the upper resist layer 22 at its projecting side faces to the bottom face thereof, but no deposit is formed on the lower resist layer 21.

Figure 3C:
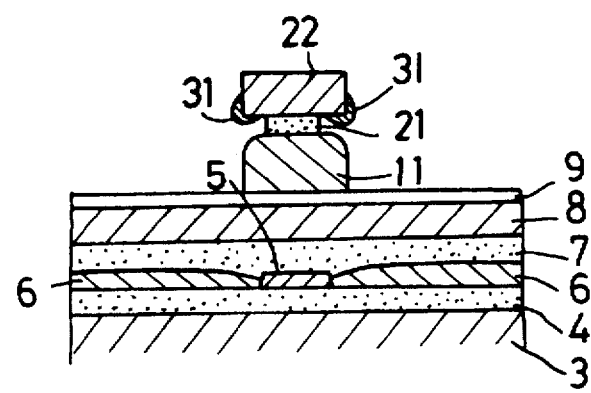

The ion beam has a component parallel to the direction of irradiation and a divergent component. The parallel component is projected onto the surface of the magnetic layer 20 perpendicular thereto as indicated by solid-line arrows, while the divergent component is projected obliquely toward spaces formed below the projecting portions of the upper resist layer 22 as indicated by broken-line arrows. The upper core layer 11 consequently shaped is therefore given a predetermined width and a surface including opposite side faces with respect to the direction of track width, a top face and a pair of curved faces R, R smoothly connecting the respective side faces to the top face as shown in FIG. 3(c).

Incidentally, U.S. Pat. No. 5,018,037 discloses a process for producing a thin film magnetic head, wherein a double resist layer is used for forming an MR element layer having opposite side faces which are so tapered as to flare toward the substrate. On the other hand, the double resist layer used for the present embodiment is adapted to shape the upper core layer 11 having the configuration shown in FIG. 3(d). The disclosure is accordingly entirely different from the present invention in respect of the layer to be etched and the contemplated configuration to be obtained by etching.

Figure 3D:
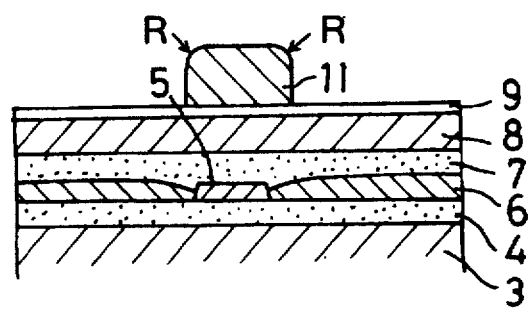

The resulting structure is subjected to an ultrasonic cleaning operation with use of n-methylpyrrolidone (NMP), isopropyl alcohol (IPA) or the like to remove the lower resist layer 21 and the upper resist layer 22 as seen in FIG. 3(d). The deposit 31 formed on the projecting portions of the upper resist layer 22 is removed along with the resist layers 21, 22, whereby the upper core layer 11 is obtained which has no deposit.

A terminal layer and a bump layer (neither shown) are thereafter successively formed by known steps, followed by formation of a protective layer 14 by sputtering. Since the surface of the upper core layer 11 includes the pair of curved faces R, R smoothly connecting the respective side faces opposed to each other in the direction of track width to the top face of the layer, the film forming the layer 14 will not grow in random directions but grows with good stability. The resulting protective layer 14 is accordingly free from defects.

The surface of the protective layer is polished to expose the bump layer, and the exposed surface is plated with gold to form a pad layer for wire bonding, whereby a composite thin film magnetic head is completed.

The magnetic head production process described realizes stabilized growth of film to form the protective layer 14 free from defects and provide a composite thin film magnetic head of high quality.

Since the curved faces R, R of the upper core layer 11 are not in parallel to the direction of width of the track, no quasi-gap will be produced to ensure inhibited contour effect.

The upper core layer 11 is formed by ion beam etching and can therefore be prepared from a material of high saturation magnetic flux density to achieve a higher recording density.

With no deposit formed on the upper core layer 11, the track width is obtained with high accuracy.

Second Embodiment

A composite thin film magnetic head of the invention includes a magnetoresistive head element H2 which comprises, like the superposed layer structure of the first embodiment shown in FIG. 1, a lower shield layer 3 formed on a substrate 1 with an insulating layer 2 provided therebetween, an MR element layer 5 and electrode layers 6, 6 successively formed on a lower insulating layer 4 over the lower shield layer 3, and an upper insulating layer 7 covering the MR element layer 5 and the electrode layers 6, 6.

Figure 4:
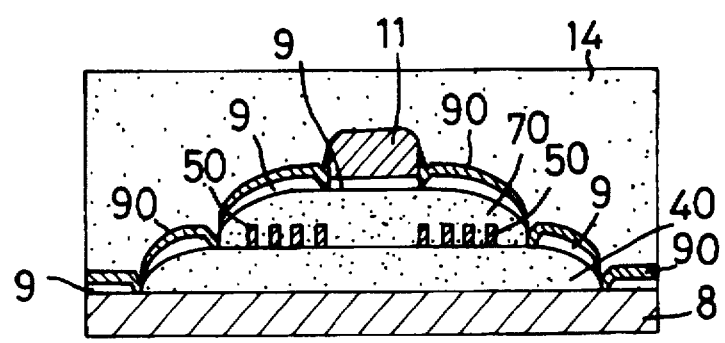
FIG. 4 is a view in section showing an inductive head element portion of a composite thin film magnetic head as a second embodiment.

On the other hand, an inductive head element H1 comprises a lower core layer 8 formed on the same upper insulating layer (not shown) as previously stated, and a lower insulating layer 40, coil layer 50 and upper insulating layer 70 successively formed over the core layer 8 as seen in FIG. 4. Further an upper core layer 11 is formed on the upper insulating layer 70 with a gap spacer layer 9 interposed therebetween. Formed at opposite sides, with respect to the direction of width of the track, of the upper core layer 11 is a nonmagnetic reinforcing member 90 having a thickness of thousands of angstroms, made of $Al_2O_3$, $SiO_2$ or the like and covering the gap spacer layer 9 to hold the layer 9 bonded to the lower core layer 8, lower insulating layer 70 with enhanced strength. The upper core layer 11 has a surface including opposite side faces with respect to the direction of track width, a top face and a pair of curved faces smoothly connecting the respective side faces to the top face. The upper core layer 11 and the nonmagnetic reinforcing layer 90 are covered with a protective layer 14.

In producing the composite thin film magnetic head described, the magnetoresistive head element H2 is first fabricated, as shown in FIG. 1, by successively forming on a substrate 1 of $Al_2O_3$—TiC superposed layers, i.e., an insulating layer 2 of $Al_2O_3$, lower shield layer 3 of Ni-Fe alloy Fe-Al-Si alloy or the like, lower insulating layer 4 of $Al_2O_3$ or the like, MR element layer 5 made of Ni-Fe alloy, soft film or the like, electrode layers 6, 6 of Cu, W, Co-Pt alloy, Co-Pt-Cr alloy or the like and upper insulating layer 7 of $Al_2O_3$ or the like. As shown in FIG. 4, the inductive head element H1 is then fabricated by successively forming superposed layers, i.e., a lower core layer 8 of Ni-Fe alloy, Co-type amorphous material or the like, lower insulating layer 40 of photoresist, coil layer 50 of Cu, and upper insulating layer 70 of photoresist. These steps are the same as in the prior art.

FIGS. 5(a) to 5(d) and FIGS. 6(a) to 6(d) show in detail the steps following the formation of the upper insulating layer 70 and ending with the formation of the upper core layer 11.

Figure 5A:
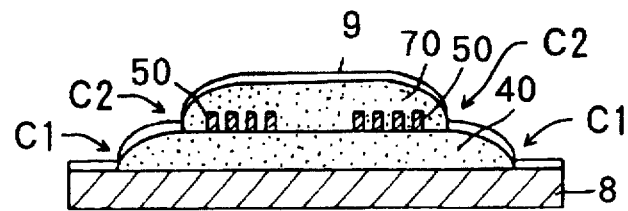
FIGS. 5(a) to 5(d) are process diagrams showing the first half of the step of forming an upper core layer of the second embodiment.

First as shown in FIG. 5(a), a gap spacer layer 9 of $Al_2O_3$ or $SiO_2$ is formed by sputtering over the lower core layer 8, lower insulating layer 40 and upper insulating layer 70. The film forming material does not deposit in a sufficient amount on the slopes of stepped portions C1, C2 on the core layer 8 and the insulating layer 40, with the result that the thickness of the film on the stepped portions C1, C2 is smaller than that on the other portion.

Figure 5B:
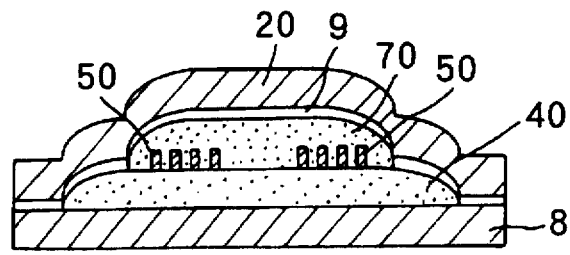

A magnetic layer 20 of Ni-Fe alloy, Co-type amorphous material or the like is then formed by sputtering over the entire surface of the gap spacer 9 as seen in FIG. 5(b). Stepped portions similar and corresponding to the stepped portions C1, C2 are formed in the magnetic layer 20 as illustrated.

Figure 5C:
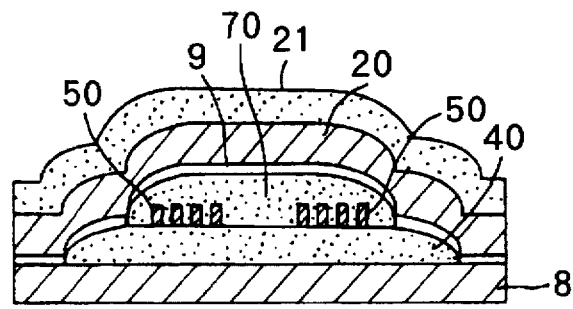
Figure 5D:
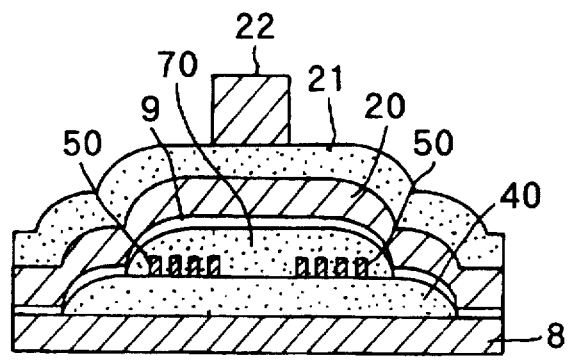

Next, the entire surface of the magnetic layer 20 is coated with a PMMA resist for use with far ultraviolet rays to form a lower resist layer 21 having a thickness, for example, of 1.0 μm as shown in FIG. 5(c). The entire surface of the layer 21 is then coated with a resist for g rays or i rays to form an upper resist layer 22, for example, 7.0 μm in thickness. The surface of the upper resist layer 22 is thereafter exposed to g rays or i rays through a mask having an aperture shaped in conformity with the shape of the upper core layer 11, followed by development to shape the upper resist layer 22 in conformity with the shape of the upper core layer when seen from above, as shown in FIG. 5(d). The upper resist layer 22 is given a width, for example, of 20 to 30 μm in the direction of track width.

Figure 6A:
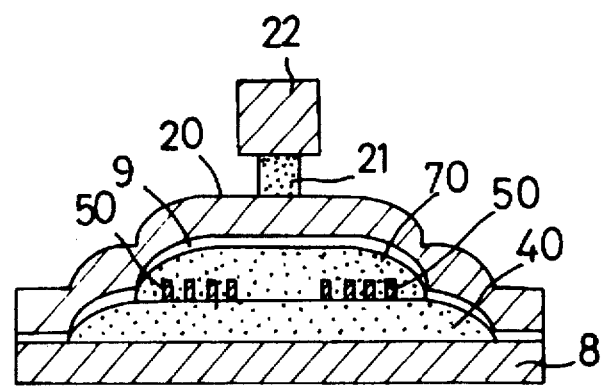
FIGS. 6(a) to 6(d) are process diagrams showing the second half of the step.

Subsequently, the surfaces of the lower resist layer 21 and the upper resist layer 22 are exposed to far ultraviolet rays, followed by development with a developer for removing the PMMA resist for far ultraviolet rays. Consequently, as shown in FIG. 6(a), an undercut extending inward of the side face of the upper resist layer 22 by 0.1 to 1.0 μm is produced in each side face of the lower resist layer 21. The lower resist layer 21 is given a smaller width than the upper resist layer 22 with respect to the direction of width of the track. Thus, the two resist layers 21, 22 appear like a double resist layer.

Figure 7:
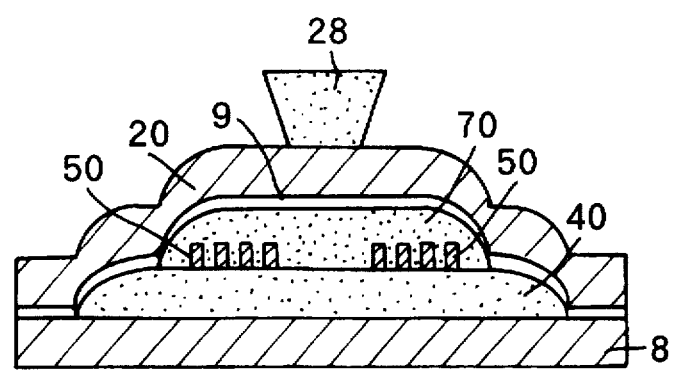
FIG. 7 is a sectional view showing the shape of a resist layer according to another embodiment.
Figure 8:
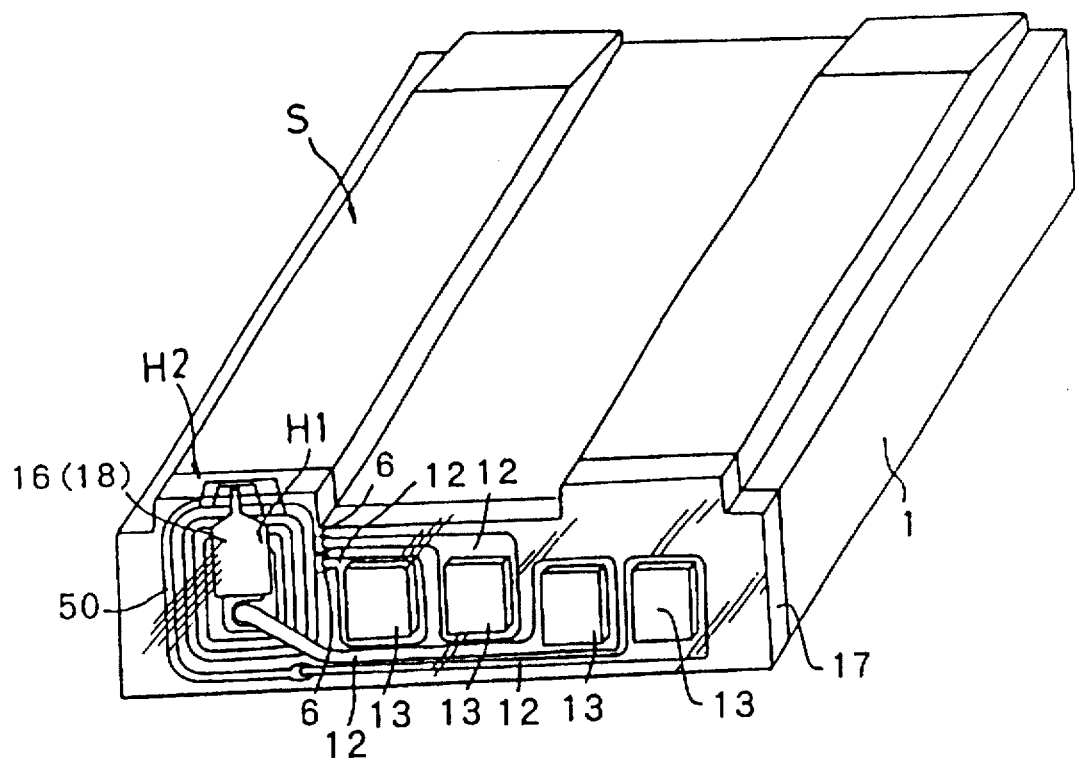
FIG. 8 is a perspective view showing the appearance of a composite thin film magnetic head.
Figure 9:
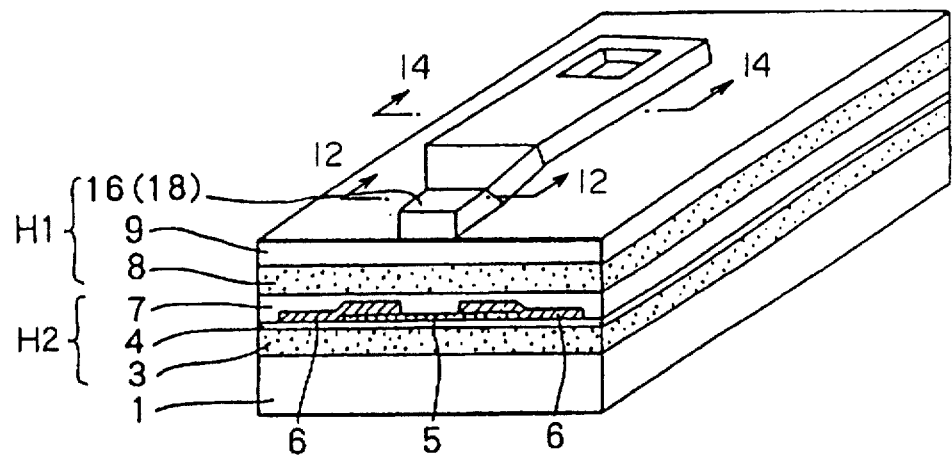
FIG. 9 is a perspective view schematically showing a structure of superposed layers providing two head elements.
Figure 10A:
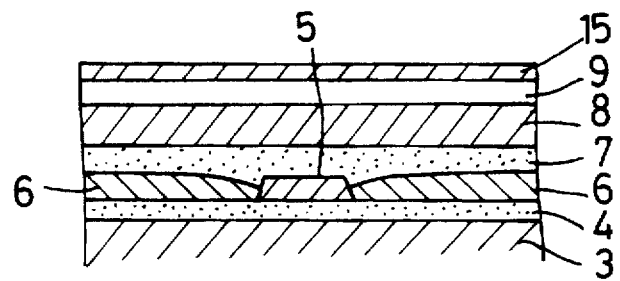
FIGS. 10(a) to 10(d) are process diagrams showing the first half of a conventional step of forming an upper core layer by electric field plating.
Figure 10B:
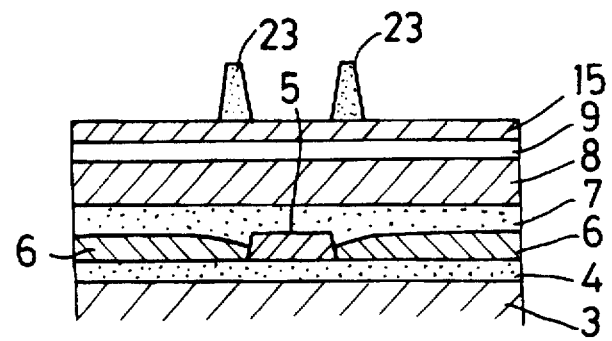
Figure 10C:
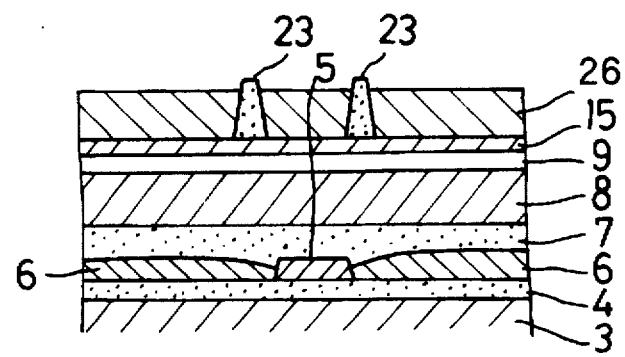
Figure 10D:
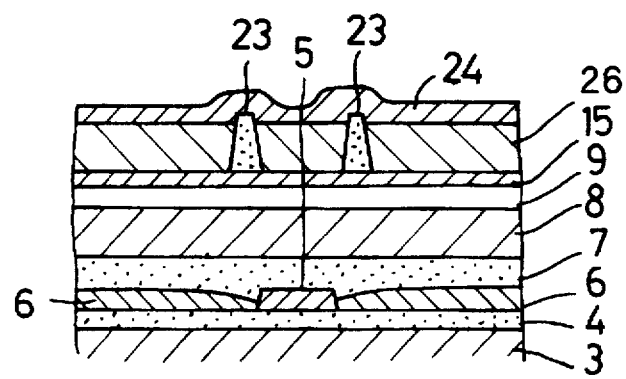
Figure 11A:
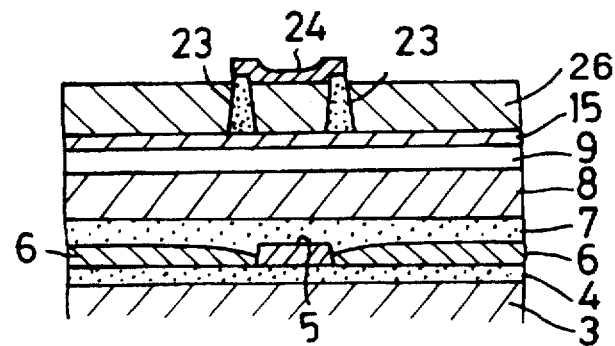
FIGS. 11(a) to 11(c) are process diagrams showing the second half of the step.
Figure 11B:
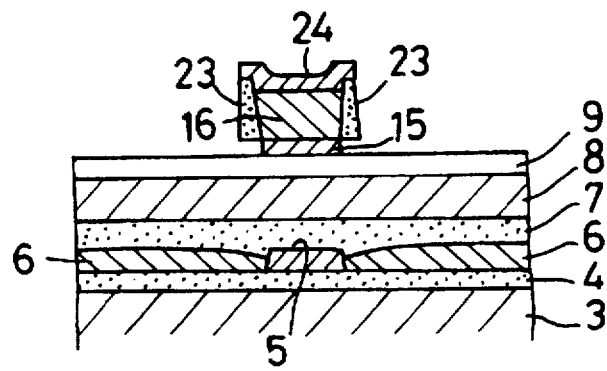
Figure 11C:
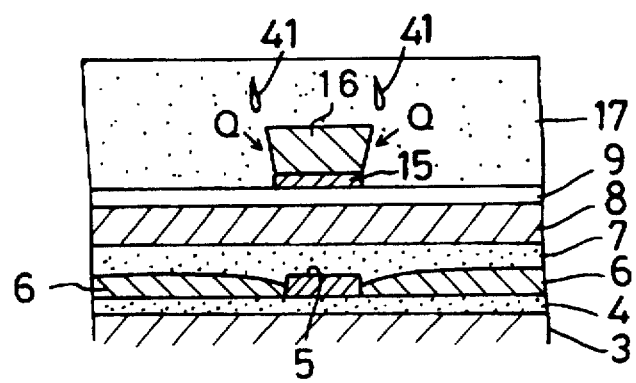
Figure 12A:
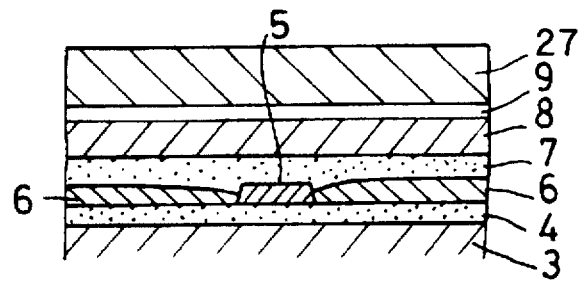
FIGS. 12(a) to 12(e) are process diagrams showing the first half of a conventional step of forming an upper core layer by ion beam etching.
Figure 12B:
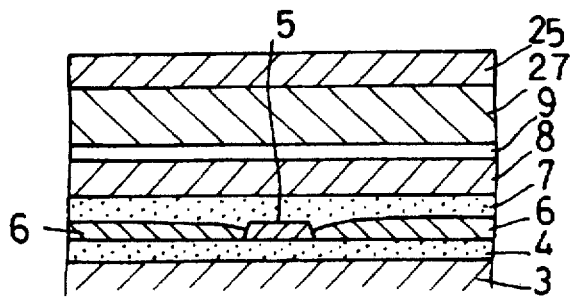
Figure 12C:
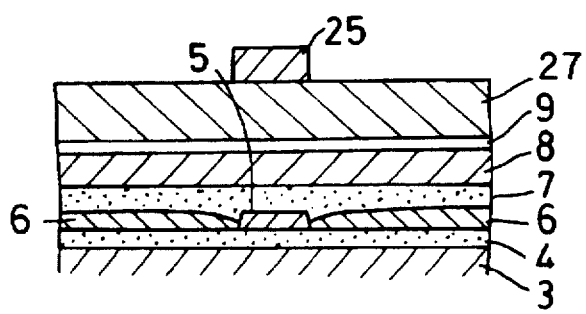
Figure 12D:
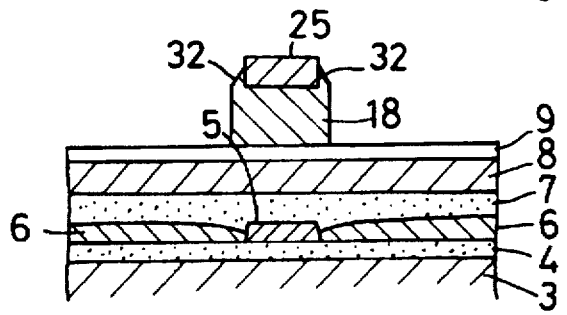
Figure 12E:
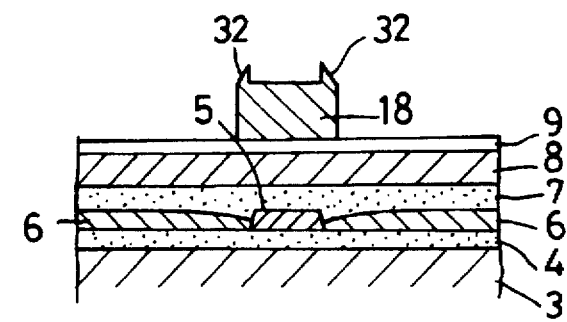
Figure 13:
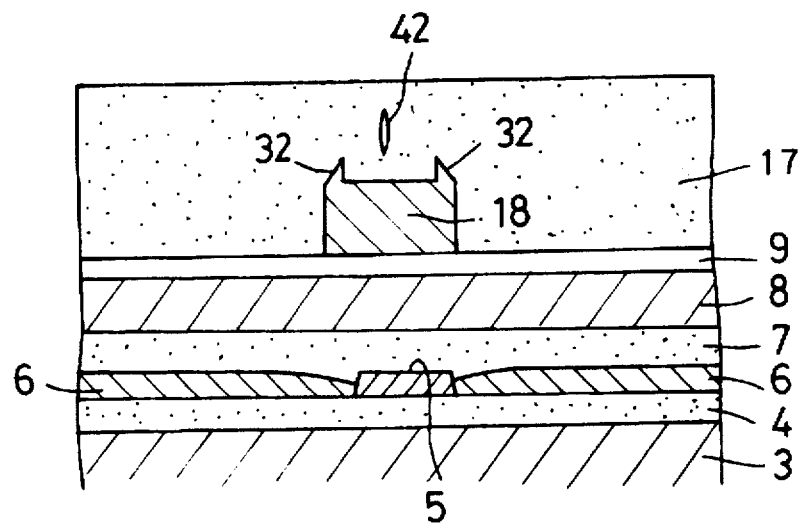
FIG. 13 is a sectional view of a composite thin film magnetic head obtained by the step of FIGS. 12(a) to 12(e)
Figure 14:
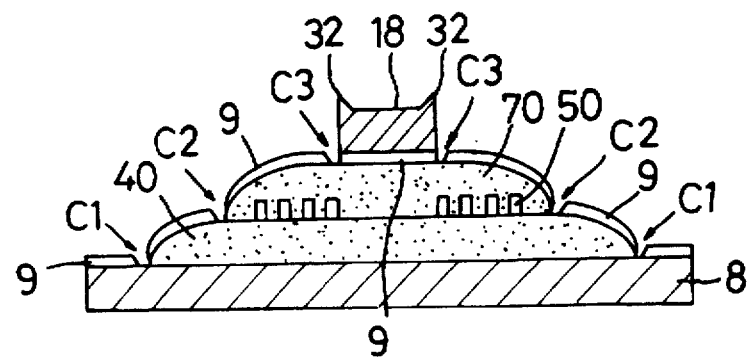
FIG. 14 is a sectional view for illustrating faults in a conventional inductive head element portion.

Instead of the resist layers 21, 22, a resist layer 28 may be formed which, as shown in FIG. 7, has a top surface shaped in conformity with the shape of the upper core layer as seen from above and side faces opposed to each other with respect to the direction of track width and tapered toward the substrate. Alternatively, it is possible to form a resist layer having a mushroom-shaped section.

Figure 6B:
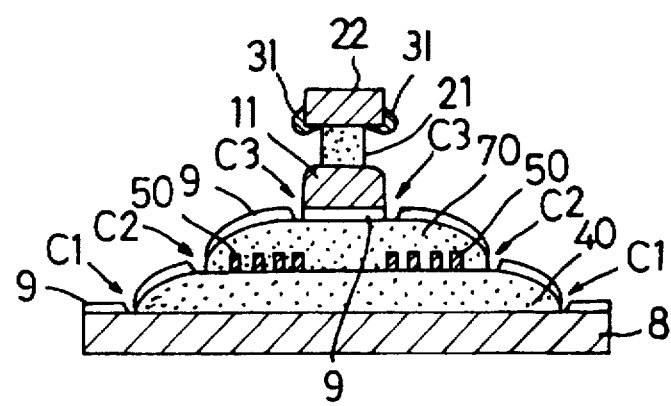

An ion beam is projected onto the surfaces of the magnetic layer 20 and the upper resist layer 22 shown in FIG. 6(a) approximately perpendicular thereto to shape the magnetic layer 20 into the upper core layer 11 as shown in FIG. 6(b). In this step, the surface of the magnetic layer 20 and the surface of the upper resist layer 22 are etched progressively depthwise. The surface of the magnetic layer 20 to be thus etched are formed with the aforementioned stepped portions, and stepped portions also extend from the surface of the magnetic layer 20 to the surface of the upper resist layer 22, so that these stepped portions are etched more rapidly than the other flat portions to a greater depth. The etching beam therefore acts on the surface of the gap spacer layer 9. The gap spacer layer 9 has a smaller thickness at the stepped portions C1 C2 as previously stated, with the result that when the upper core layer 11 has been completely shaped as shown in FIG. 6(b), the gap spacer layer 9 is completely removed from the stepped portions C1, C2, locally exposing the lower core layer 8 and the lower insulating layer 40 beneath the layer 9. Because of the higher etching speed, it is likely that the spacer layer 9 will be removed also from the stepped portions C3 to locally expose the upper insulating layer 70 as illustrated.

Since the upper resist layer 22 projects outward beyond the opposite side faces of the lower resist layer 21 with respect to the direction of track width, the deposit 31 produced by ion beam etching does not adhere to the lower resist layer 21 but adheres to the projecting portions of the upper resist layer 22 as shown in FIG. 6(b) as in the first embodiment. The etching operation forms on the surface of the upper core layer 11 a pair of curved faces smoothly connecting the side faces of the layer 11 with respect to the track width direction to the top face thereof.

Figure 6C:
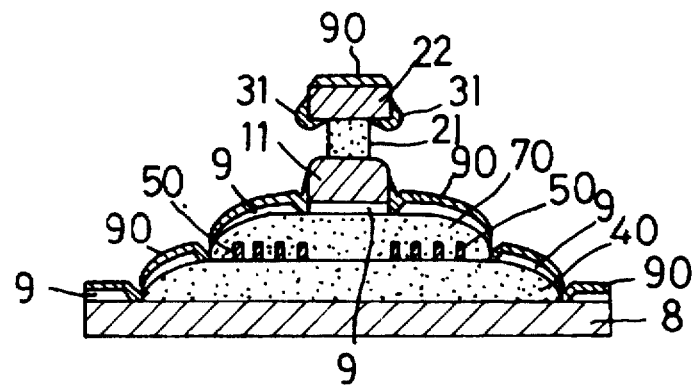

Subsequently, a nonmagnetic reinforcing layer 90 of $Al_2O_3$, $SiO_2$ or the like having the same thickness as the gap spacer layer 9, e.g., a thickness of thousands of angstroms, is formed by sputtering over the upper resist layer 22 and the gap spacer layer 9 as shown in FIG. 6(c). With the upper resist layer 22 projecting outward beyond the opposite side faces, with respect to the track width direction, of the lower resist layer 21, the nonmagnetic reinforcing layer 90 is not deposited on the side faces of the resist layer 21, and the portion of the reinforcing layer 90 on the upper resist layer 22 is separate from the portion of the layer 90 on the gap spacer layer 9.

Figure 6D:
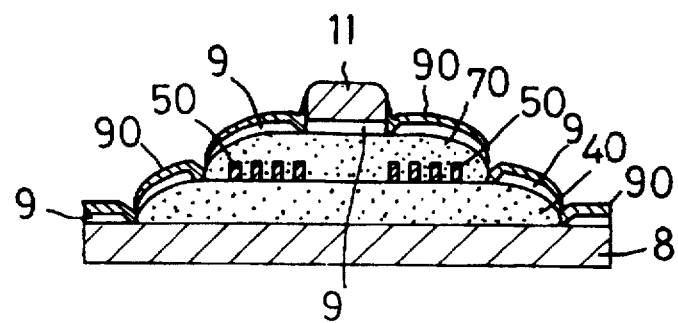

The resulting structure is subjected to an ultrasonic cleaning operation as with n-methylpyrrolidone (NMP) to remove the lower resist layer 21 and the upper resist layer 22 as seen in FIG. 6(d). The cleaning liquid is prevented by the reinforcing layer 90 from penetrating into the lower core layer 8, lower insulating layer 40 and upper insulating layer 70.

As a result, the nonmagnetic reinforcing layer 90 adhering to the top surface of the upper resist layer 22 is removed along with the resist layers 21, 22. Thus, the desired nonmagnetic reinforcing layer 90 is formed on the opposite sides of the upper core layer 11 by using the lift-off method.

The deposit 31 adhering to the projecting portions of the upper resist layer 22 is also removed along with the resist layers 21, 22, and the layer 11 obtained is free from such deposit.

A terminal layer and a bump layer (neither shown) are then successively formed by known steps, followed by formation of a protective layer 14 of $Al_2O_3$ by sputtering. The curved faces formed on the surface of the upper core layer 11 as stated above assure stabilized growth of film to give a flawless protective layer 14.

The surface of the protective layer 14 is polished to expose the bump layer, and the exposed surface is plated with gold to form a pad layer for wire bonding, whereby a composite thin film magnetic head is completed.

With the magnetic head production process described, the lower core layer 8, and the lower and upper insulating layers 40, 70 are covered with the nonmagnetic reinforcing layer 90 and are therefore prevented from swelling, while the gap spacer layer 9 and the upper core layer 11 are precluded by the layer 90 from separating off. This enables the process to achieve an improved yield.

The reinforcing layer 90 is deposited also on opposite side faces of the upper core layer 11 with respect to the track width direction, connecting the core layer side faces to the surface of the gap spacer layer 9. The core layer 11 is therefore reliably prevented from separating off in the resist layer removing step.

The second embodiment has the same advantages as the first embodiment because the surface of the upper core layer 11 includes a pair of curved faces smoothly connecting the side faces thereof opposed with respect to the track width direction to its top face.

The embodiments described above are intended to illustrate the present invention and should not be construed as limiting the invention defined in the appended claims or reducing the scope thereof. Furthermore, the construction of the present device is not limited to those of the embodiments but can of course be modified variously without departing from the spirit of the invention as set forth in the claims.

For example, the ion beam is projected onto the magnetic layer 20 and the upper resist layer 22 approximately perpendicular thereto for etching in the upper core layer forming step according to the first embodiment, whereas the beam can be projected obliquely, for example, at an angle of 45 deg.

Although the PMMA resist for far ultraviolet rays is used for forming the lower resist layer 21, and the resist for g rays or i rays for the upper resist layer 22 according to the first and second embodiments described, these materials are not limitative but other materials are also usable insofar as they have different sensitivities to the light source to be used for exposure in the subsequent steps.

The nonmagnetic reinforcing layer 90 need not always be formed by $Al_2O_3$ or $SiO_2$ but other known nonmagnetic materials, preferably nonmagnetic and electrically nonconductive materials, are also usable.

Furthermore, a nonmagnetic reinforcing layer forming step can be used for the first embodiment as is the case with the second embodiment.

What is claimed is:

1. A thin film magnetic head comprising at least one inductive head element provided on a substrate, the head element comprising a lower core layer, an upper core layer and a gap spacer layer interposed between the core layers, the head element being covered in its entirety with a protective layer, the upper core layer having a surface in contact with the protective layer and including opposite side faces with respect to the direction of width of a track, a top face and a pair of curved faces smoothly connecting the respective side faces to the top face.

2. A thin film magnetic head comprising at least one inductive head element provided on a substrate, the head element comprising a coil layer formed above a lower core layer and held between a lower insulating layer and an upper insulating layer, and an upper core layer formed on the upper insulating layer with a gap spacer layer interposed therebetween, the head element being covered in its entirety with a protective layer, the upper core layer being provided, at opposite sides thereof with respect to the direction of width of a track, with a nonmagnetic reinforcing layer over the gap spacer layer, the protective layer being formed over the nonmagnetic reinforcing layer and the upper core layer.

3. A thin film magnetic head comprising at least one inductive head element provided on a substrate, the head element comprising a coil layer formed above a lower core layer and held between a lower insulating layer and an upper insulating layer, and an upper core layer formed on the upper insulating layer with a gap spacer layer interposed therebetween, the head element being covered in its entirety with a protective layer, the upper core layer having a surface in contact with the protective layer and including opposite side faces with respect to the direction of width of a track, a top face and a pair of curved faces smoothly connecting the respective side faces to the top face, the upper core layer being provided, at opposite sides thereof with respect to the track width direction, with a nonmagnetic reinforcing layer over the gap spacer layer, the protective layer being formed over the nonmagnetic reinforcing layer and the upper core layer.

4. A thin film magnetic head comprising at least one inductive head element provided on a substrate, the head element comprising a lower core layer, an upper core layer and a gap spacer layer interposed between the core layers, the head element being covered in its entirety with a protective layer, the upper core layer having a top face in contact with the protective layer and a lower face in contact with the gap spacer layer, the top face extending in parallel to a surface of the gap spacer layer and having a smaller width than the lower face in the track width direction.

* * * * *

UNITED STATES PATENT AND TRADEMARK OFFICE
CERTIFICATE OF CORRECTION

PATENT NO. : 5,793,579
DATED : August 11, 1998
INVENTOR(S) : Yamamoto et al.

It is certified that error appears in the above-identified patent and that said Letters Patent is hereby corrected as shown below:

Column 2, line 23, "A-A" should read -- 12-12 --.

Column 3, line 24, "B-B" should read -- 14-14 --.

Signed and Sealed this

Sixteenth Day of February, 1999

Attest:

Attesting Officer

Acting Commissioner of Patents and Trademarks